United States Patent
Roshen

(10) Patent No.: US 8,566,842 B2
(45) Date of Patent: Oct. 22, 2013

(54) IDENTIFICATION OF A PROTOCOL USED IN A MESSAGE

(75) Inventor: Waseem A. Roshen, Hilliard, OH (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 13/078,483

(22) Filed: Apr. 1, 2011

(65) Prior Publication Data

US 2012/0254891 A1  Oct. 4, 2012

(51) Int. Cl.
*G06F 9/44* (2006.01)
*G06F 15/16* (2006.01)

(52) U.S. Cl.
USPC .......................................... 719/313; 709/230

(58) Field of Classification Search
None
See application file for complete search history.

(56) References Cited

U.S. PATENT DOCUMENTS

| | | | |
|---|---|---|---|
| 6,785,274 B2 | 8/2004 | Mahajan et al. | |
| 7,548,514 B1 | 6/2009 | Choudhury et al. | |
| 7,626,982 B2 | 12/2009 | Akadiri | |
| 7,707,401 B2* | 4/2010 | Miller et al. | 713/153 |
| 7,783,782 B2 | 8/2010 | Cromp et al. | |
| 7,792,767 B2* | 9/2010 | Leitheiser | 706/20 |
| 7,814,226 B2 | 10/2010 | Patrick | |
| 7,870,295 B2 | 1/2011 | Johnson | |
| 7,966,373 B1 | 6/2011 | Smith et al. | |
| 7,991,840 B2 | 8/2011 | Boyer et al. | |
| 8,095,670 B2 | 1/2012 | Brown et al. | |
| 8,112,434 B2 | 2/2012 | Patten, Jr. et al. | |
| 8,139,569 B2 | 3/2012 | Akadiri | |
| 8,140,582 B2 | 3/2012 | Chen et al. | |
| 8,166,130 B2 | 4/2012 | Reinart | |
| 8,249,083 B2 | 8/2012 | Hulse et al. | |
| 8,260,944 B2 | 9/2012 | Gilfix et al. | |
| 8,265,970 B2 | 9/2012 | Conroy et al. | |
| 8,280,964 B2 | 10/2012 | Sawant | |
| 8,423,671 B2* | 4/2013 | Kim | 709/246 |
| 2002/0186694 A1 | 12/2002 | Mahajan et al. | |
| 2004/0049714 A1 | 3/2004 | Marples et al. | |
| 2004/0186918 A1* | 9/2004 | Lonnfors et al. | 709/250 |
| 2006/0075132 A1* | 4/2006 | Liu | 709/236 |
| 2006/0101115 A1 | 5/2006 | Gleckman | |
| 2007/0162421 A1 | 7/2007 | Pang et al. | |

(Continued)

FOREIGN PATENT DOCUMENTS

| | | |
|---|---|---|
| EP | 1855218 A2 | 11/2007 |
| WO | 2006113092 A2 | 10/2006 |
| WO | 2008078366 A1 | 12/2006 |

OTHER PUBLICATIONS

Papazoglou et al., "Service Oriented Architectures: Approaches, Technologies and Research Issues", VLDB Journal, Springer Berlin / Heidelberg, vol. 16, No. 3, Jul. 2007, pp. 389-415(27).

(Continued)

*Primary Examiner* — Charles E Anya
(74) *Attorney, Agent, or Firm* — Yee & Associates, P.C.; John R. Pivnichny

(57) ABSTRACT

A method and computer program product for identifying a protocol used in a message are presented. The message is received at a socket associated with a port in a communication system. A portion of the message containing protocol information is identified in response to the message being received at the socket. The protocol used in the message is identified from the protocol information in the portion of the message. The message is forwarded to a process configured to process the protocol.

20 Claims, 9 Drawing Sheets

(56) References Cited

U.S. PATENT DOCUMENTS

| | | | |
|---|---|---|---|
| 2008/0019391 A1* | 1/2008 | Breitkreutz | 370/466 |
| 2008/0069124 A1 | 3/2008 | Patrick | |
| 2008/0086370 A1 | 4/2008 | Narayanaswami et al. | |
| 2008/0120380 A1 | 5/2008 | Boyd et al. | |
| 2008/0130682 A1 | 6/2008 | Akadiri | |
| 2008/0140857 A1 | 6/2008 | Conner et al. | |
| 2008/0187004 A1 | 8/2008 | Johnson | |
| 2008/0306751 A1 | 12/2008 | Conroy et al. | |
| 2009/0018998 A1 | 1/2009 | Patten, Jr. et al. | |
| 2009/0049040 A1 | 2/2009 | Fay et al. | |
| 2009/0063522 A1 | 3/2009 | Fay et al. | |
| 2009/0070456 A1 | 3/2009 | Brown et al. | |
| 2009/0070790 A1 | 3/2009 | Gilfix et al. | |
| 2009/0089078 A1 | 4/2009 | Bursey | |
| 2009/0125332 A1 | 5/2009 | Martin | |
| 2009/0132698 A1 | 5/2009 | Barnhill, Jr. | |
| 2009/0193096 A1 | 7/2009 | Boyer et al. | |
| 2009/0210408 A1 | 8/2009 | Boyer et al. | |
| 2009/0221310 A1 | 9/2009 | Chen et al. | |
| 2009/0235167 A1 | 9/2009 | Boyer et al. | |
| 2009/0307321 A1 | 12/2009 | Sawant | |
| 2009/0319686 A1 | 12/2009 | Watanabe | |
| 2010/0005466 A1 | 1/2010 | MacFarlane et al. | |
| 2010/0030855 A1 | 2/2010 | Akadiri | |
| 2010/0037237 A1 | 2/2010 | Reinart | |
| 2010/0042670 A1 | 2/2010 | Kamalakantha et al. | |
| 2010/0061382 A1 | 3/2010 | Hulse et al. | |
| 2010/0088326 A1 | 4/2010 | Chen et al. | |
| 2010/0124227 A1 | 5/2010 | Williams et al. | |
| 2010/0125567 A1* | 5/2010 | Morris | 707/722 |
| 2010/0150169 A1 | 6/2010 | Brown et al. | |
| 2010/0159961 A1 | 6/2010 | Bowman et al. | |
| 2010/0161362 A1 | 6/2010 | Shapira et al. | |
| 2010/0205612 A1* | 8/2010 | Bhatia et al. | 719/314 |
| 2010/0208875 A1 | 8/2010 | Vandenbulcke et al. | |
| 2010/0223344 A1 | 9/2010 | Little | |
| 2010/0235552 A1* | 9/2010 | Holden et al. | 710/72 |
| 2011/0004694 A1* | 1/2011 | Taylor | 709/230 |
| 2011/0125821 A1 | 5/2011 | Roshen | |
| 2013/0091293 A1 | 4/2013 | Roshen | |

OTHER PUBLICATIONS

Soto-Carrion et al., "General Ontology Service Engine (GORSE): a new approach to integrate the semantic web knowledge on service oriented architectures", pp. 1-22 retrieved Nov. 2009 http://www.imai-software.com/openlab/data/GORSE_DRAFTv0_1.pdf.

"osESB Documentation, Part 1: The SOA Stack and the ESB", Nov. 5, 2007, pp. 1-22 http://www.osesb.org/documentation/The%20SOA%20Stack%20and%20the%20ESB.pdf.

Pohlsen et al., "A Concept for a Medical Device Plug-and-Play Architecture based on Web Services", pp. 1-7, retrieved Oct. 20, 2009 http://sigbed.seas.upenn.edu/archives/2009-07/SchlichtingSIGBED.pdf.

"CG 6000 Series Platform for the new era of communications", Open Access Product Data Sheet, NMS Communications, pp. 1-4, retrieved Mar. 21, 2011 www.nmscommunications.com.

Gupta, "Enterprise Service Bus Capabilities Comparison", Apr. 2008, Project Performance Corporation, McLean, Virginia, pp. 1-21.

"MULE ESB", Mulesoft, 2011, pp. 1-2, retrieved Mar. 2011 www.mulesoft.com.

U.S. Appl. No. 12/625,331, filed Dec. 11, 2009, Roshen.

Office Action regarding U.S. Appl. No. 12/625,331, dated Jan. 6, 2012, 34 pages.

USPTO Final Office Action, dated Jun. 22, 2012, regarding U.S. Appl. No. 12/625,331, 6 pages.

USPTO Notice of Allowance, dated Sep. 19, 2012, regarding U.S. Appl. No. 12/625,331, 12 pages.

Roshen, "Service Oriented Architecture Enterprise Service Bus with Universal Ports," USPTO U.S. Appl. No. 13/687,854, filed Nov. 28, 2012, 40 pages.

Final Office Action, dated Apr. 24, 2013, regarding USPTO U.S. Appl. No. 13/687,854, 27 pages.

Office Action, dated Jan. 17, 2013, regarding USPTO U.S. Appl. No. 13/687,854, 26 pages.

* cited by examiner

700

GET/intro.html HTTP/1.1 ⁓702
User-Agent: Mozilla/5.0 (Windows;en-GB; rv:1.8.0.11) Gecko/20070312
Accept: text/xml,text/html;q=0.9,text/plain;q=0.8,image/png,*/*;q=0.5
Accept-Language: en-gb,en;q=0.5
Accept-Encoding: gzip,deflate
Accept-Charset: ISO-8859-1,utf-8;q=0.7,*;q=0.7
Keep-Alive: 300
Connection: keep-alive

800

Protocol: HTTP  Format: SOAP — 802
804 — GET/intro.html HTTP/1.1
User-Agent: Mozilla/5.0 (Windows;en-GB; rv:1.8.0.11) Gecko/20070312
Accept: text/xml,text/html;q=0.9,text/plain;q=0.8,image/png,*/*;q=0.5
Accept-Language: en-gb,en;q=0.5
Accept-Encoding: gzip,deflate
Accept-Charset: ISO-8859-1,utf-8;q=0.7,*;q=0.7
Keep-Alive: 300
Connection: keep-alive

FIG. 10

```
import java.io.*;
import java.net.* ;
public class testServer {
//declare a socket server and a socket client
SocketServer myServer = null;
ClientServer myClient = null;
//declare an input stream and an output stream
DataInputStream in;
PrintStream out;
//declare a variable to hold the first line of the incoming message
String firstLine = null;
//open a socket for listening at the port number 8080
```

1002 — `myServer = new ServerSocket (8080);`
```
//accept connection
myClient = myServer.accept();
```
1004 — `//get the incoming message`
`in = new DataInputStream ( myClient.getInputStream());`

1006 — `//store the first line of the message in a local variable`
`firstLine = in.getLine();`
```
...
...
}
```

1000

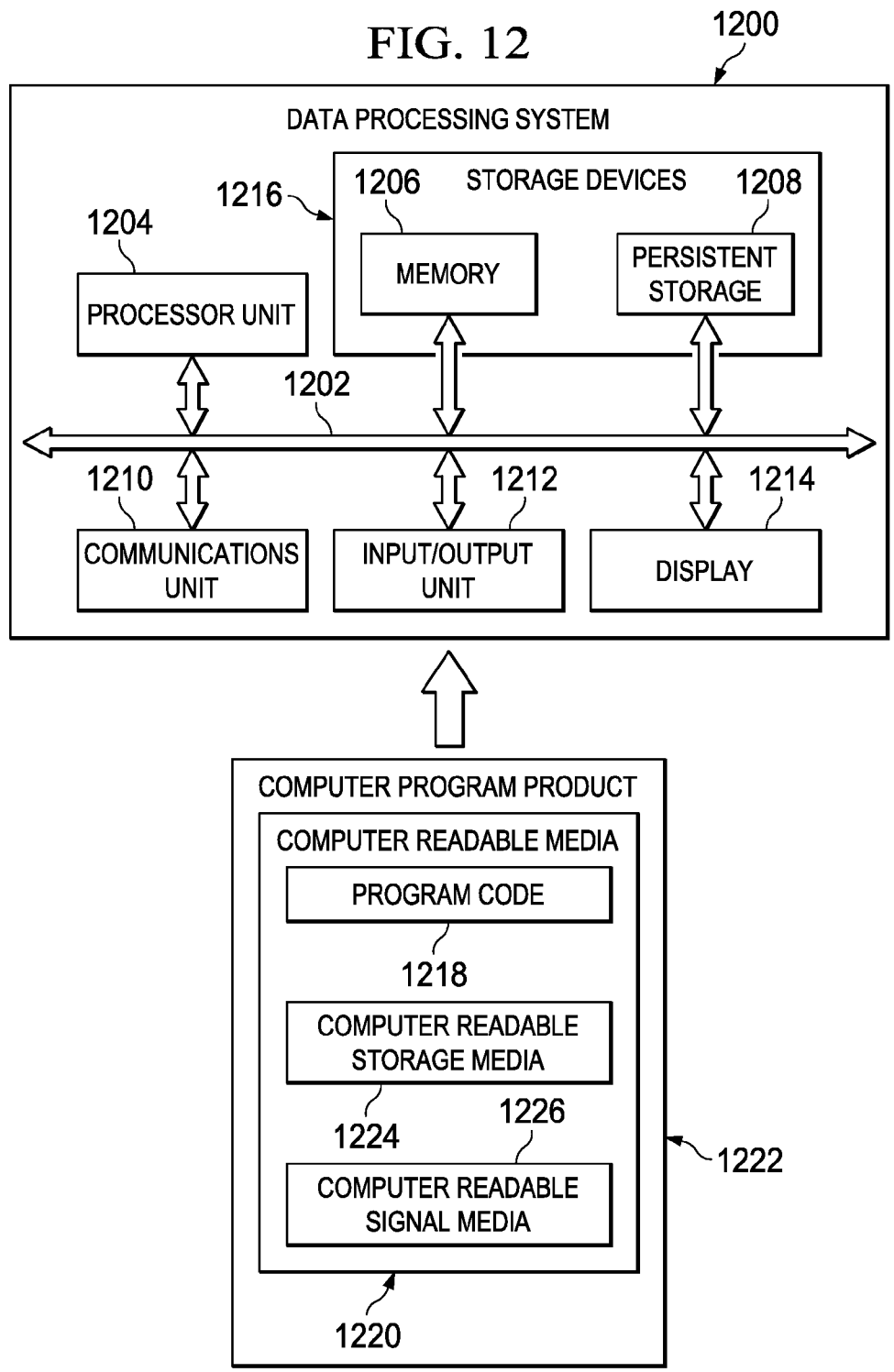

IDENTIFICATION OF A PROTOCOL USED IN A MESSAGE

BACKGROUND

1. Field

The disclosure relates generally to communication protocols and more particularly to communication systems for providing an interface for messages between applications in a network. Still more particularly, the present disclosure relates to identifying protocols used in messages received at universal ports for an enterprise service bus.

2. Description of the Related Art

An enterprise service bus (ESB) is software that provides a connection between applications in a network. An enterprise service bus provides connections between applications within a same computer. An enterprise service bus provides connections between applications located on remote computers. The enterprise service bus is used to connect applications so that the functionality and data of one application can be shared across all applications connected to the enterprise service bus.

The enterprise service bus enables applications to communicate and send messages back and forth to each other. For example, a requesting application may request data from a provider application. The enterprise service bus receives and forwards the request to the provider application. In response, the provider application sends a message to the requesting applications. The message is received by the enterprise service bus and forwarded to the requesting application. In this manner, the enterprise service bus provides communications between applications.

The enterprise service bus may also adapt messages for use by the applications. For example, the requesting application may use a one communication protocol and message format while the provider application uses a different communication protocol or message format. The enterprise service bus upon receiving a message from the provider application may modify the message into a form that may be used by the source application. For example, the enterprise service bus may convert the communication protocol used in the message into a communication protocol that can be interpreted by the requesting application.

However, multiple different protocols may be used in a network. For the enterprise service bus to be able to handle all the messages sent in the network, the enterprise service bus needs to be able to use each of the different protocols used in the network. For the enterprise service bus to handle messages using multiple different protocols, large amounts of code are used by the enterprise service bus. The use of large amounts of code may be costly to develop and maintain.

Accordingly, it would be advantageous to have a method and computer program product, which take into account one or more of the issues discussed above as well as possibly other issues.

SUMMARY

The different illustrative embodiments provide a method and computer program product for identifying a protocol used in a message. The message is received at a socket associated with a port in a communication system. A portion of the message containing protocol information is identified in response to the message being received at the socket. The protocol used in the message is identified from the protocol information in the portion of the message. The message is forwarded to a process configured to process the protocol.

The different illustrative embodiments further provide a method for identifying a protocol used in a message. The message is received at a port in a communication system. A first header is identified in the message in addition to a second header in the message in response to the message being received. The first header has a format using a first protocol. The second header has a format using the protocol used in the message. The protocol used in the message is identified from the first header of the message using a module associated with the port. The module is configured to identify information using the first protocol.

BRIEF DESCRIPTION OF THE SEVERAL VIEWS OF THE DRAWINGS

FIG. 10 is an illustration of exemplary program code for identifying a protocol used in a message in accordance with an illustrative embodiment;

FIG. 12 is an illustration of a data processing system in accordance with an illustrative embodiment.

DETAILED DESCRIPTION

Figure 1:
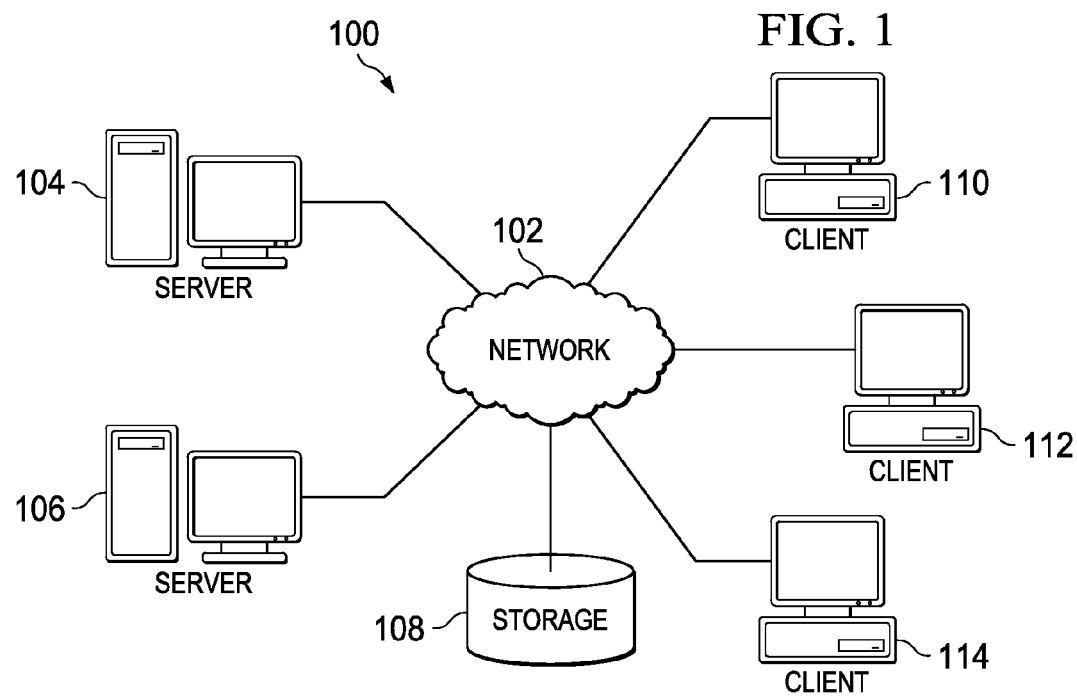
FIG. 1 is an illustration of a data processing environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages.

In these illustrative examples, applications on any one of client computers 110, 112, and 114 or server computers 104 and 106 may communicate with each other using network 102. Server computer 104 may include a communication system for providing connections between the applications in network data processing system 100. For example, the communication system may identify the protocol used in messages sent by applications in network data processing system 100. The communication system may also process the messages so that the messages may be received and used by other applications in network data processing system 100.

Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
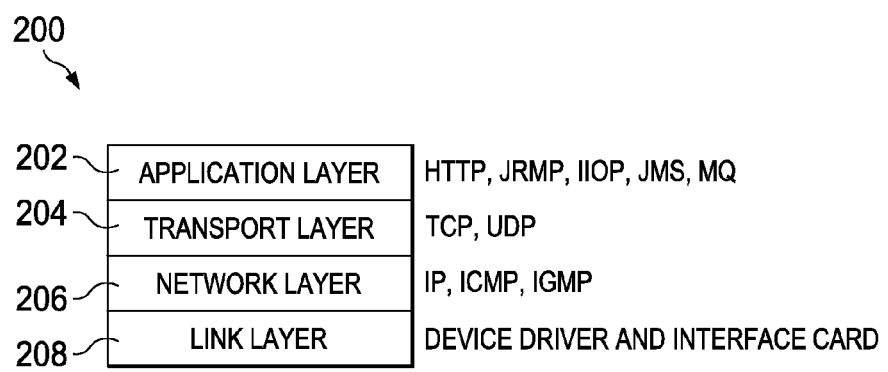
FIG. 2 is a block diagram of a communication architecture in a network in accordance with an illustrative embodiment.

With reference now to FIG. 2, a block diagram of a communication architecture is depicted in accordance with an illustrative embodiment. Communication architecture 200 includes protocols that are used at layers in a network. A protocol is a set of rules for exchanging data in a network. A "set", as used herein with reference to an item, means one or more items. For example, communication architecture 200 may be an internet protocol suite for exchanging messages on the internet.

In this example, communication architecture 200 is a 4-layer system. Communication architecture 200 includes application layer 202, transport layer 204, network layer 206, and link layer 208. Each layer is responsible for handling various communication tasks. Link layer 208 is an example of a data-link layer or a network interface layer. Link layer 208 normally includes a device driver in an operating system of a computer and a network interface card for the computer. Link layer 208 handles the hardware details of physically interfacing with the network media being used, such as optical cables or Ethernet cables.

Network layer 206 is an example of the internet layer and handles the movement of packets of data around the network. For example, network layer 206 handles the routing of various packets of data that are transferred over the network. Network layer 206 comprises of several protocols, including, for example, without limitation, Internet protocol (IP), Internet control message protocol (ICMP), and Internet group management protocol (IGMP).

Transport layer 204 provides an interface between network layer 206 and application layer 202 that facilitates the transfer of data between two host computers. Transport layer 204 is concerned with functions such as, for example, dividing the data passed to it from the application for the network layer below, acknowledging received packets, and setting timeouts to make certain the other end acknowledges packets that are sent. Transport layer 204 comprises of several protocols, including, for example, without limitation, transmission control protocol (TCP) and user datagram protocol (UDP).

Application layer 202 includes the applications that are present in the network. The applications exchange messages using protocols in application layer 202. Application layer 202 comprises of several protocols, including, for example, without limitation, hypertext transfer protocol (HTTP), Java remote method protocol (JRMP), Internet inter-ORB protocol (IIOP), Java message service (JMS), and message queue (MQ).

In these illustrative examples, applications may use any number of different protocols in application layer 202. In communicating between different applications in a network, the protocol used in a message may need to be identified. Illustrative embodiments may be implemented in different layers in communication architecture 200 to identify the protocol used in the message.

Communication architecture 200 may include other layers and protocols. For example, communication architecture 200 may include a physical layer, a session layer, a presentation layer, or any other layer in a communication system in a network. FIG. 2 is intended as an example, and not as an architectural limitation for the different illustrative embodiments.

The different illustrative embodiments recognize and take into account a number of different considerations. For example, the different illustrative embodiments recognize and take into account that messages exchanged between applications in a network may use different protocols. For example, one application that sends a message may use hypertext transfer protocol, while another application may use Java message service.

The different illustrative embodiments further recognize and take into account that for the message to be delivered to the destination, the protocol used in the message may have to be identified. For example, the message may be received in a communication system. The communication system may need to identify the protocol used in the message. The communication system may also need to handle the message according to rules of the protocol used in the message.

The different illustrative embodiments recognize that one solution may involve including a separate port in the communication system for each protocol used in the network. Thus, all applications in the network using one protocol would send messages to the port in the communication system for the one protocol.

However, the different illustrative embodiments recognize and take into account that having ports that can only handle one type of protocol is not efficient. For example, the communication system would have to have at least one port for each protocol used by applications in the network in order to handle all the messages. Additionally, some protocols may be used more often than other protocols. Thus, some ports may not process messages as quickly as desired because of overuse while other ports are rarely used.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

The different illustrative embodiments recognize that one solution may involve universal ports that can handle multiple different protocols. The universal ports may include a number of processes for each of the number of processes for handling at least one of the multiple different protocols. A "number", as used herein with reference to an item, means one or more items. When a message is received the message is passed among the number of processes until one process can handle the message. For example, the one process is configured to handle messages using the protocol used in the message.

However, the different illustrative embodiments recognize and take into account that using a number of processes at the universal ports may not be desirable. For example, having a process for handling each protocol in a network results in a large amount of code used at the universal port. The larger the amount of code at the universal port the more difficult the code may be to maintain and update. Also, if certain protocols are not commonly used in the network, then portions of the code at the universal port will not be used very often. Maintaining code that is not used very often can be costly and inefficient.

Thus, the different illustrative embodiments provide a method and computer program product for identifying a protocol used in a message. The message is received at a socket associated with a port in a communication system. A portion of the message containing protocol information is identified in response to the message being received at the socket. The protocol used in the message is identified from the protocol information in the portion of the message. The message is forwarded to a process configured to process the protocol.

As used herein, a first item may be considered to be associated with a second item by being linked with the second component, joined with the second component, combined with the second component, and/or connected with the second component in some other suitable manner. The first component also may be connected to the second component through using a third component. The first component may also be considered to be associated with the second component by being formed as part of and/or an extension of the second component.

The different illustrative embodiments further provide a method for identifying a protocol used in a message. The message is received at a port in a communication system. A first header is identified in the message in addition to a second header in the message in response to the message being received. The first header has a format using a first protocol. The second header has a format using the protocol used in the message. The protocol used in the message is identified from the first header of the message using a module associated with the port. The module is configured to identify information using the first protocol.

Figure 3:
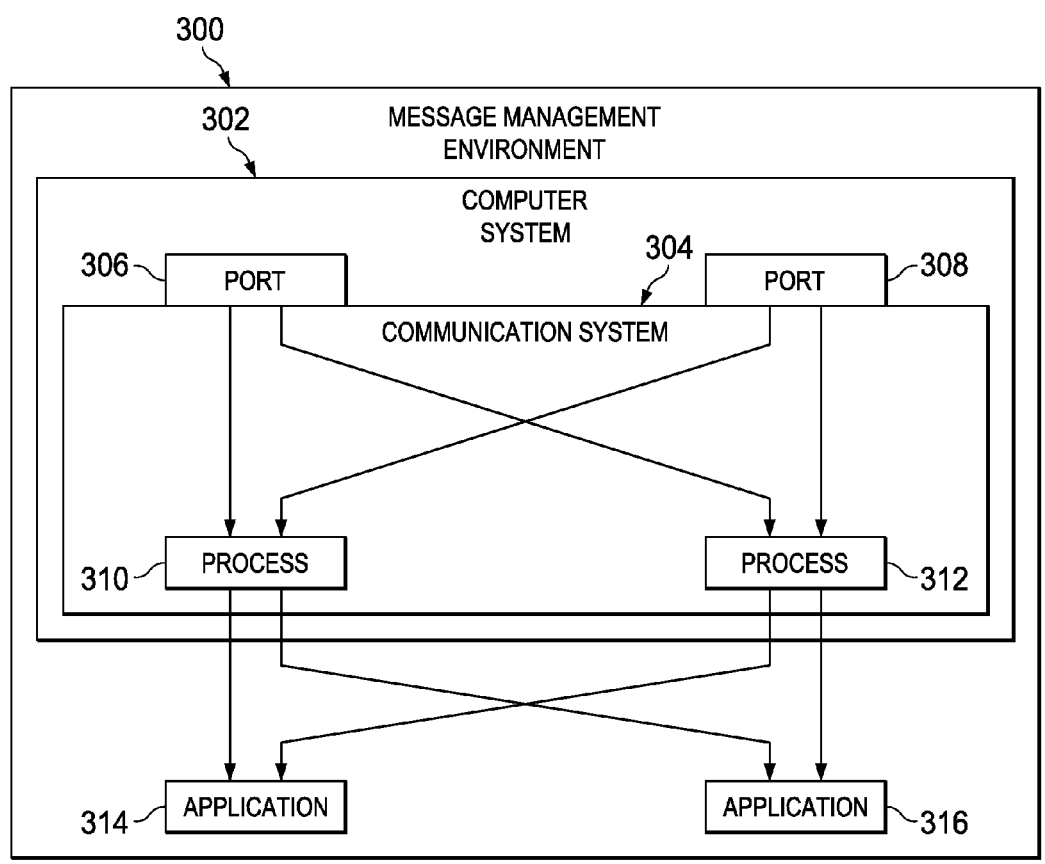
FIG. 3 is an illustration of a block diagram of a message management environment in accordance with an illustrative embodiment.

With reference now to FIG. 3, a block diagram of a message management environment is depicted in accordance with an illustrative embodiment. Message management environment 300 is an environment in which illustrative embodiments may be implemented. In message management environment 300, messages communicated in a network are managed.

Computer system 302 is hardware and also may include software. Computer system 302 manages messages received in message management environment 300. Computer system 302 is an example of at least one of client computers client computers 110, 112, and 114 and server computers 104 and 106, in FIG. 1.

Communication system 304 is software that provides connections between applications in a network. For example, communication system 304 is an enterprise service bus. Messages are received by communication system 304 at port 306 and port 308. In these illustrative examples, port 306 and port 308 are software. The protocol used in the message is identified at port 306 and port 308. The message is forwarded to process 310 or process 312 depending on the protocol identified. For example, port 306 identifies the protocol used in a message as hypertext transfer protocol. Process 310 is configured to process messages using hypertext transfer protocol. Then port 306 will forward the message to process 310.

Process 310 and process 312 process messages using a protocol. Process 310 and process 312 are software components that process messages. For example, process 310 may process the message to extract information from a body of the message. In another example, process 310 may identify an intended destination of the message. The intended destination may be application 314 or application 316. Process 310 forwards the message to application 314 or application 316 based on this determination.

Process 310 and process 312 also process a message according to the protocol used in the message. For example, the message may be set according to a set of rules specified in a protocol. The protocol used in the message is the protocol that would be used in sending the message. For example, the message may be sent using hypertext transport protocol. Process 310 may be configured to process messages that are sent using hypertext transport protocol.

Additionally, process 310 may modify the message into a form that may be used by application 314. For example, the protocol used in the message may not be the same protocol used by application 314. Process 310 may convert the message from the protocol used in the message to the protocol used by application 314. Then application 314 will be able to understand and use the information in the message.

The illustration of message management environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, communication system 304 may include any number of different ports and processes. Communication system 304 may be implemented in multiple computer systems across a network.

Figure 4:
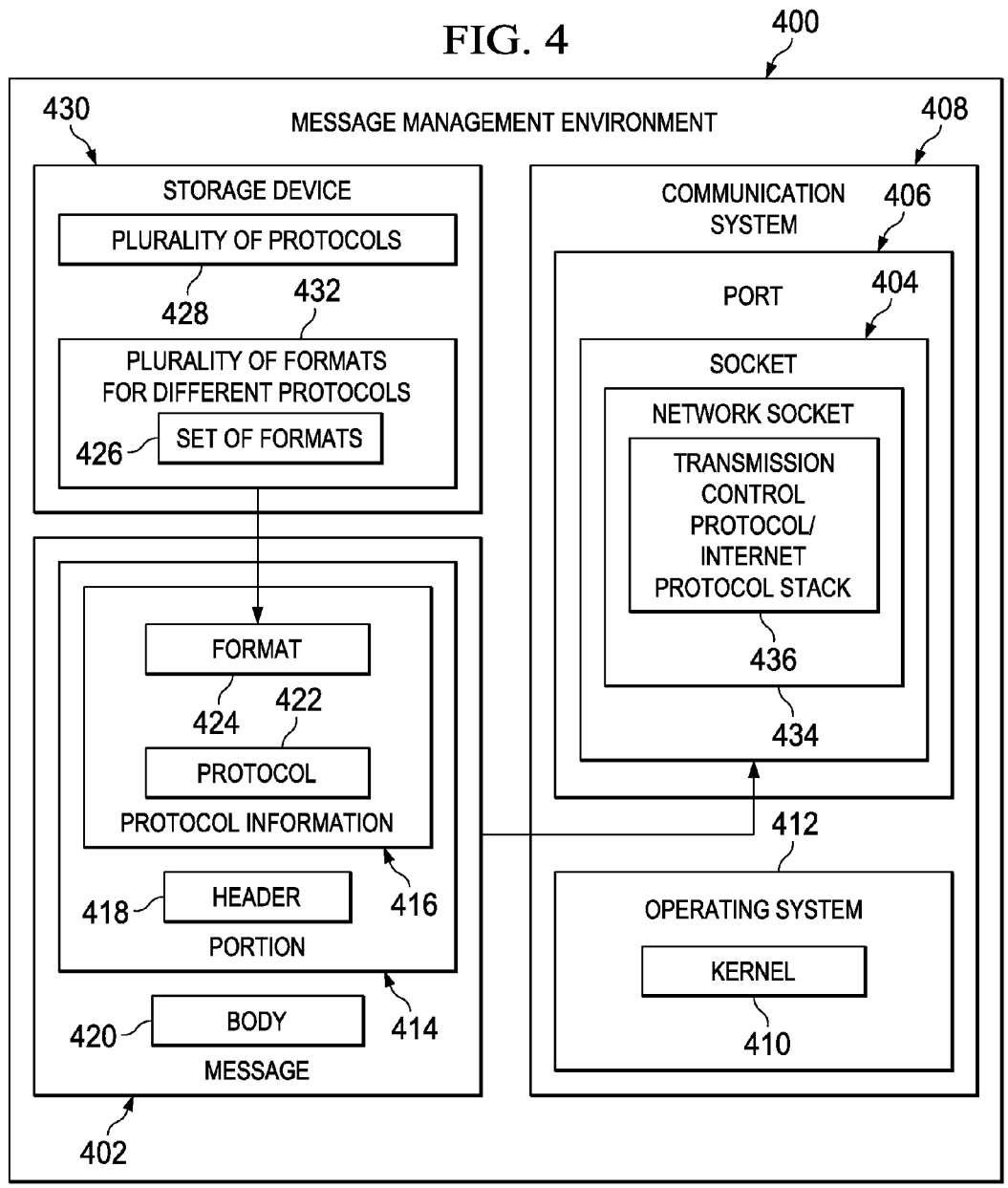
FIG. 4 is an illustration of a block diagram of a communication system in a message management environment in accordance with an illustrative embodiment.

With reference now to FIG. 4, a block diagram of a communication system in a message management environment is depicted in accordance with an illustrative embodiment. Message management environment 400 is an environment in which illustrative embodiments may be implemented. Message management environment 400 includes communication system 408. Communication system 408 is an example of one embodiment of communication system 304 in FIG. 3. For example, port 406 and socket 404 may be implemented in communication system 304 in FIG. 3. Additionally, communication system 408 and storage device 430 may be implemented in computer system 302 in FIG. 3.

Message 402 is received at socket 404 associated with port 406 in communication system 408. Message 402 is a message sent from one application to another application in a network. Message 402 may be a packet or a request, for example.

In these illustrative examples, socket 404 is an endpoint in a flow of communication in a network. Socket 404 is a software interface for delivering messages to an application. For example, socket 404 may be provided by kernel 410 of operating system 412 for communication system 408.

When message 402 is received at socket 404, port 406 identifies portion 414 of message 402 containing protocol information 416. Portion 414 is an example of header 418. Header 418 is data included in message 402 in addition to body 420. Body 420 is the actual data to be used by the application that will receive message 402. Header 418 may include information such as a sender address, a recipient address, protocol 422 used in message 402, the format used in message 402, and other information about message 402.

Port 406 identifies protocol 422 from portion 414 containing protocol information 416. Port 406 identifies protocol 422 by comparing format 424 of portion 414 with set of formats 426. Set of formats 426 are formats of protocol information for plurality of protocols 428 used in message management environment 400. The format of the protocol information for each of plurality of protocols 428 is stored in storage device 430. As a result, storage device 430 stores plurality of formats for different protocols 432. Port 406 compares portion 414 with plurality of formats for different protocols 432. When one of the plurality of formats for different protocols 432 matches format 424 of portion 414, port 406 identifies the protocol of the matching one as protocol 422 used in message 402.

Port 406 identifies protocol 422 when message 402 is received at socket 404 and before message 402 is forwarded to any intended recipient application. As discussed above, applications use protocols in the application layer, such as application layer 202 in FIG. 2. If protocol 422 has not been identified by the time message 402 is forwarded to an application, the application may not be able to understand the information in message 402. For example, protocol 422 used in message 402 may not be the same as the protocol used by the application.

On the other hand, socket 404 is an example of network socket 434. Network socket 434 is an interface for transmission control protocol/internet protocol stack 436. Transmission control protocol/internet protocol stack 436 is implemented in layers such as network layer 206 and transport layer 204 in FIG. 2. Messages sent in a network, such as the internet, for example, are exchanged using protocols, such as, Internet protocol and transmission control protocol, for example.

When message 402 is received at socket 404, port 406 processes message 402 using Internet protocol and/or transmission control protocol. While processing message 402, port 406 also compares format 424 of portion 414 with set of formats 426 to identify protocol 422 as discussed above. Protocol 422 is identified using protocols at the transport and or network layers prior to the message being passed to applications using protocols in the applications layer. Once protocol 422 has been identified, message 402 is processed so that message 402 may be forwarded to an application using protocols on the application layer.

Figure 5:
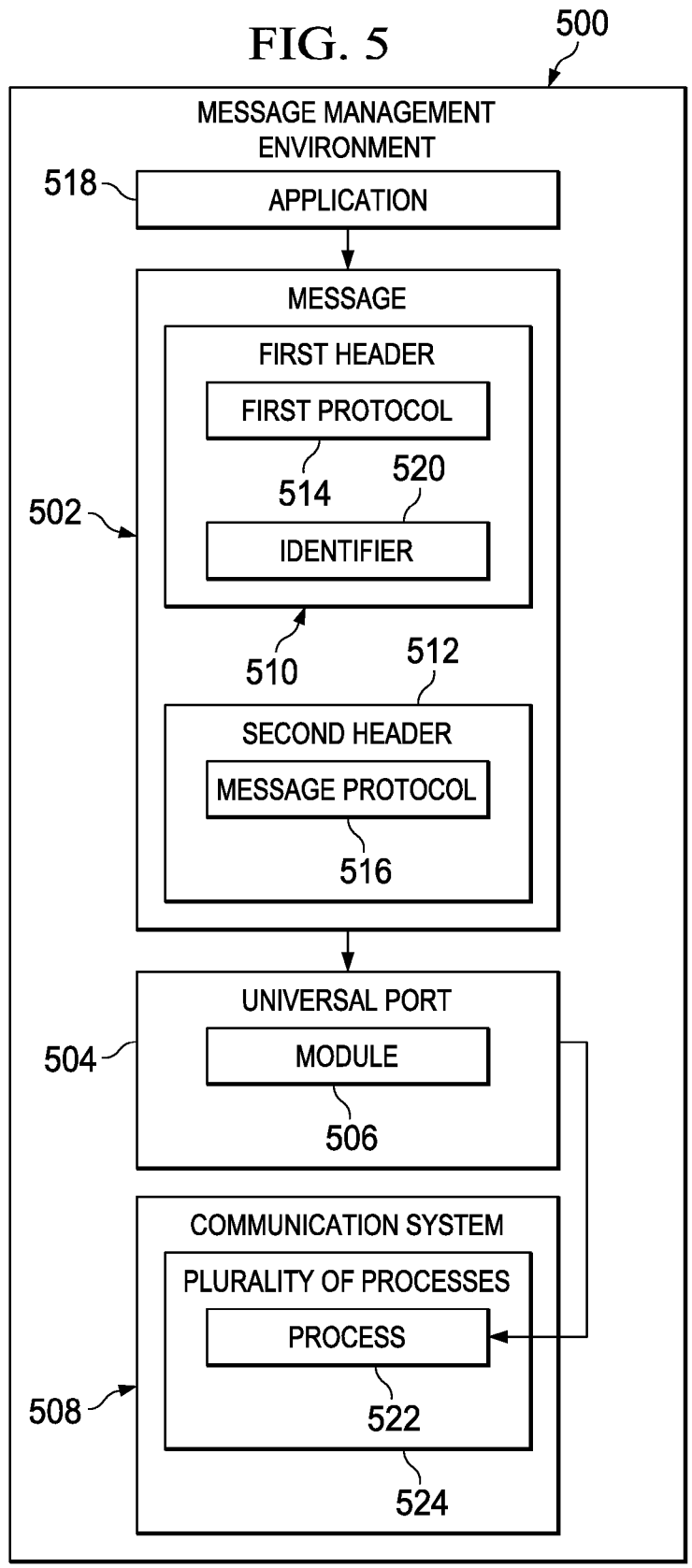
FIG. 5 is an illustration of a block diagram of a communication system in a message management environment in accordance with an illustrative embodiment.

With reference now to FIG. 5, a block diagram of a communication system in a message management environment is depicted in accordance with an illustrative embodiment. Message management environment 500 is an environment in which illustrative embodiments may be implemented. Message management environment 500 includes communication system 508. Communication system 508 is an example of another embodiment of communication system 304 in FIG. 3. For example, universal port 504 and module 506 may be implemented in communication system 304 in FIG. 3. Additionally, message 502 is an example of a type of message that can be received at communication system 304 in FIG. 3.

Message 502 is received at universal port 504 of communication system 508. Universal port 504 is universal in that it may receive messages using any number of different protocols.

Module 506 identifies first header 510 and second header 512 in message 502. Module 506 is a component in universal port 504 that processes information using first protocol 514. In these examples, first protocol 514 is a set of rules for formatting first header 514. First protocol 514 is a protocol that is different than message protocol used in message 502. First protocol 514 is the protocol used in first header 510. For example, first protocol 514 is an example of a super protocol that is used in first header 510 in addition to message protocol 516 used in message 502.

First header 510 is added to message 502 by application 518. Application 518 is the application that sent message 502. Application 518 adds first header 510 to message 502 using first protocol 514. Application 518 adds first header 510 according to the set of rules in first protocol 514. For example, application 518 formats first header 510 in a format specified in first protocol 514. Application 518 may also position first header 510 in a position within message 502 according to first protocol 514. For example, first header 510 may be an envelope added to message 502.

Additionally, application 518 includes identifier 520 in first header 510. Identifier 520 is included in a format according to first protocol 514. For example, first protocol 514 includes rules for including identifier 520 in first header 510. Identifier 520 is an identifier of message protocol 516. Identifier 520 contains information for identifying message protocol 516 used in message 502. For example, application 518 uses message protocol 516. Prior to sending message 502 using message protocol 516, application 518 adds first header 510 using first protocol 514. First protocol 514 is also used by module 506. When message 502 is received at universal port 504, module 506 is able to identify message protocol 516 because module 506 uses first protocol 514.

When module 506 has identified message protocol 516, module 506 forwards message 502 to process 522 of plurality of processes 524. Process 522 is an example of one implementation of process 310 and process 312 in FIG. 3. Process 522 is a process that is configured to process messages that use message protocol 516.

The illustrations of message management environment 400 in FIG. 4 and message management environment 500 in FIG. 5 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, port 406 may include a separate component for identifying protocol 422, such that protocol 422 is identified prior to message 402 being received in communication system 408. In other examples, protocol 422 may be identified from body 420 of message 402. For example, the format of body 420 may be compared with formats of bodies using known protocols.

In other illustrative embodiments, first header 510 may be placed anywhere within message 502. For example, first header 510 may be placed at the beginning, in the middle, or at the end of message 502. In yet other illustrative examples, first header 510 may be placed in message 502 by an intermediate application. For example, application 518 may send message 502. Then message 502 may be intercepted by an intermediate application that adds first header 510 to message 502. Then message 502 is sent to communication system 508. The intermediate application may be for example located on the same computer as application 518.

Figures 6, 7:
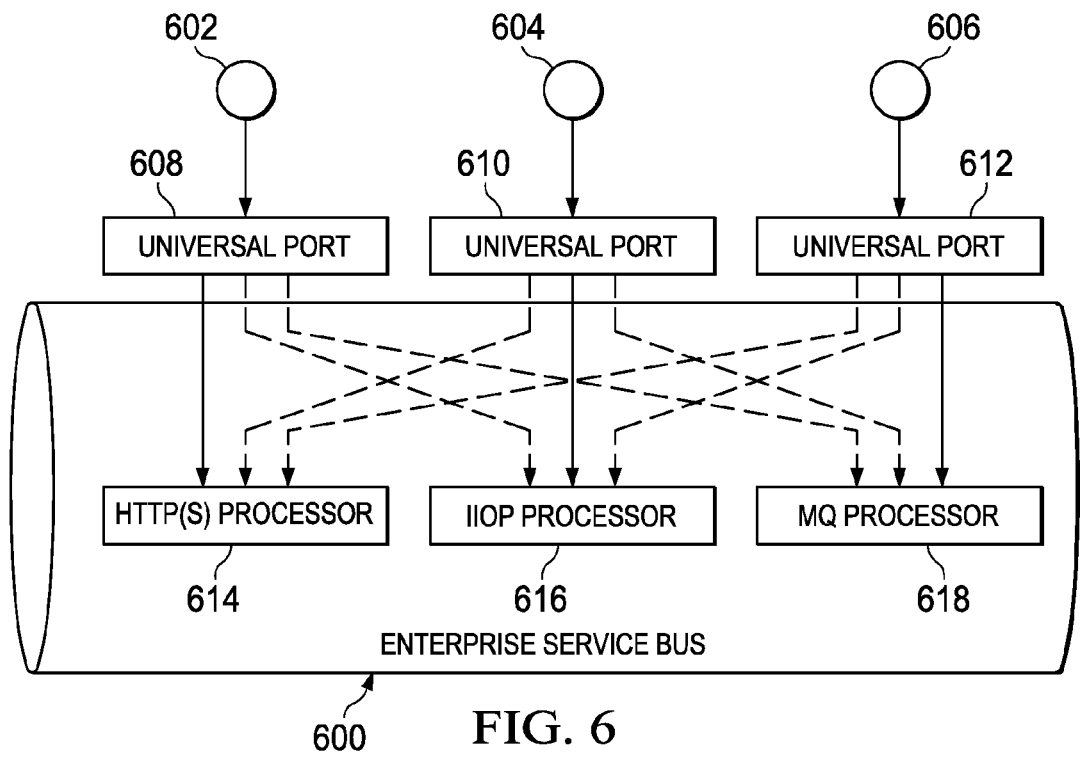
FIG. 6 is an illustration of an enterprise service bus in accordance with an illustrative embodiment.
FIG. 7 is an illustration of header information in a message in accordance with an illustrative embodiment.

With reference now to FIG. 6, an enterprise service bus is depicted in accordance with an illustrative embodiment. Enterprise service bus 600 is an example of one implementation of communication system 408 in FIG. 4. Enterprise service bus 600 is also an example of one implementation of communication system 508 in FIG. 5.

Messages 602, 604, and 606 are received at universal ports 608, 610, and 612, respectively. Universal port 608 identifies the protocol used in message 602. Universal port 608 forwards message 602 to one of HTTP(S) Processor 614, IIOP Processor 616, and MQ Processor 618. HTTP(S) Processor 614, IIOP Processor 616, and MQ Processor 618 are software processors configured to process messages using hypertext transfer protocol, Internet inter-ORB protocol, and message queue protocol, respectively.

Universal ports 608, 610, and 612 include components to identify the protocol used in incoming messages. The components can be used for any protocol used in the network. Thus, each time a message is received at enterprise service bus 600 the components are reused.

The illustration of enterprise service bus 600 in FIG. 6 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, any number of processors may be used to process any number of different protocols. Also any number of universal ports may be used in enterprise service bus 600.

With reference now to FIG. 7, an illustration of header information in a message is depicted in accordance with an illustrative embodiment. Header information 700 is an example of header information that may be in a message such as message 402 in FIG. 4. Header information 700 is also an example of header information that may be received at a socket, such as socket 404 in FIG. 4, for example. Header information 700 is an example of portion 414 of message 402 that contains protocol information 416 in FIG. 4.

In this example, header information 700 is an example of a header for a message that uses hypertext transfer protocol. For example, a port, such as port 406 in FIG. 4 for example, can identify a protocol used in a message from header information 700. In this example, the port could identify hypertext transfer protocol as the protocol used in the message from parsing line 702 of header information 700.

Figures 8, 9:
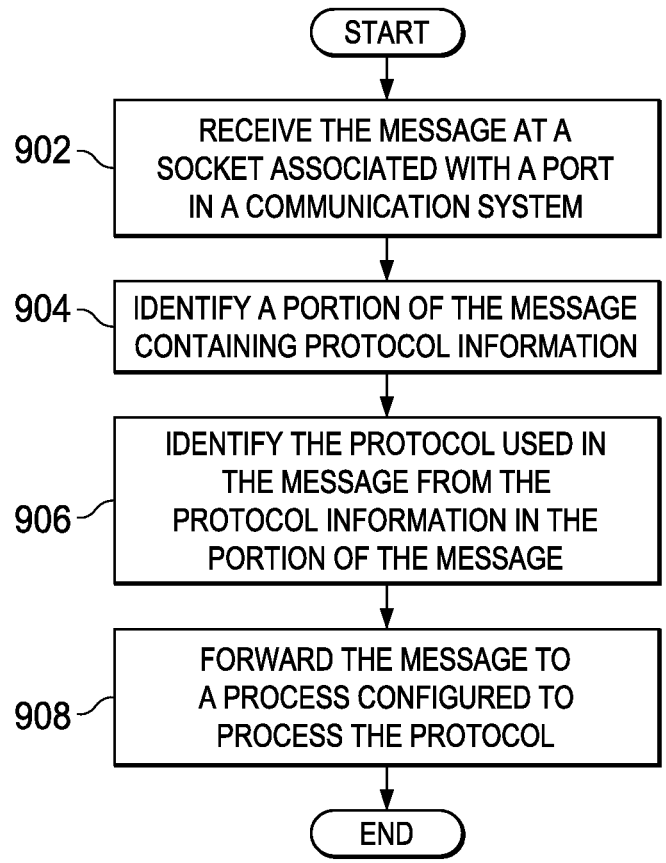
FIG. 8 is an illustration of header information in a message in accordance with an illustrative embodiment.
FIG. 9 is a flowchart of a process for identifying a protocol used in a message in accordance with an illustrative embodiment.

With reference now to FIG. 8, an illustration of header information in a message is depicted in accordance with an illustrative embodiment. Header information 800 is an example of header information that may be in a message such as message 502 in FIG. 5. Header information 800 is also an example of header information that may be processed by a module, such as, for example, module 506 in FIG. 5, to identify the protocol, such as, for example, message protocol 516 in FIG. 5.

In this example, header information 800 is an example of a header for a message that uses hypertext transfer protocol. Header information 800 includes first header 802 and second header 804. First header 802 includes the protocol used in the message. In this example, first header 802 specifies hypertext transfer protocol (HTTP) as the protocol used in the message. First header 802 is generated using a separate protocol that is used by the application that sent the message as well as the module that identifies the protocol used in the message. For example, first header 802 may be using a super protocol designed to convey the protocol used in the message.

In this above example, first header 802 also includes the format of the message. In this example, the format of the message is simple object access protocol (SOAP). Second header 804 is an example of a header that is standard for messages using hypertext transfer protocol.

With reference now to FIG. 9, a flowchart of a process for identifying a protocol used in a message is depicted in accordance with an illustrative embodiment. The process illustrated in FIG. 9 may be implemented in computer system 302 in FIG. 3. The process also may be implemented by port 406 in FIG. 4.

The process begins by receiving the message at a socket associated with a port in a communication system (step 902). The process then identifies a portion of the message containing protocol information (step 904). In step, 904 the portion of the message is identified when the message is received at the socket. Thereafter the process identifies the protocol used in the message from the protocol information in the portion of the message (step 906). In step 906, the protocol of the message is identified before the message is forwarded to an application. The protocol is identified using internet protocol and/or transmission control protocol. Thus the protocol is identified at the internet socket level prior to the message being forwarded to the application level.

The process then forwards the message to a process configured to process the protocol (step 908), with the processes terminating thereafter. In step 908, the process may be a software processor that process messages using the protocol used in the message. The process identifies an intended recipient of the message. The process may also modify the message so that the intended recipient may understand the information in the message.

With reference now to FIG. 10, an illustration of exemplary program code for identifying a protocol used in a message is depicted in accordance with an illustrative embodiment. Program code 1000 is an example of program code that may be used to implement steps for identifying a protocol used in a message, such as for example steps 902 and 904 in FIG. 9.

In this example, program code 1000 is written in Java™ programming language. Line 1002 is an example of program code for opening a socket, such as, for example, socket 404 in FIG. 4. Line 1004 is an example of program code for receiving an incoming message. Line 1004 is an example of program code for implementing step 902 in FIG. 9. Line 1006 is an example of program code for obtaining a portion of the message containing protocol information. Line 1006 is an example of program code for implementing step 904 in FIG. 9.

Figure 11:
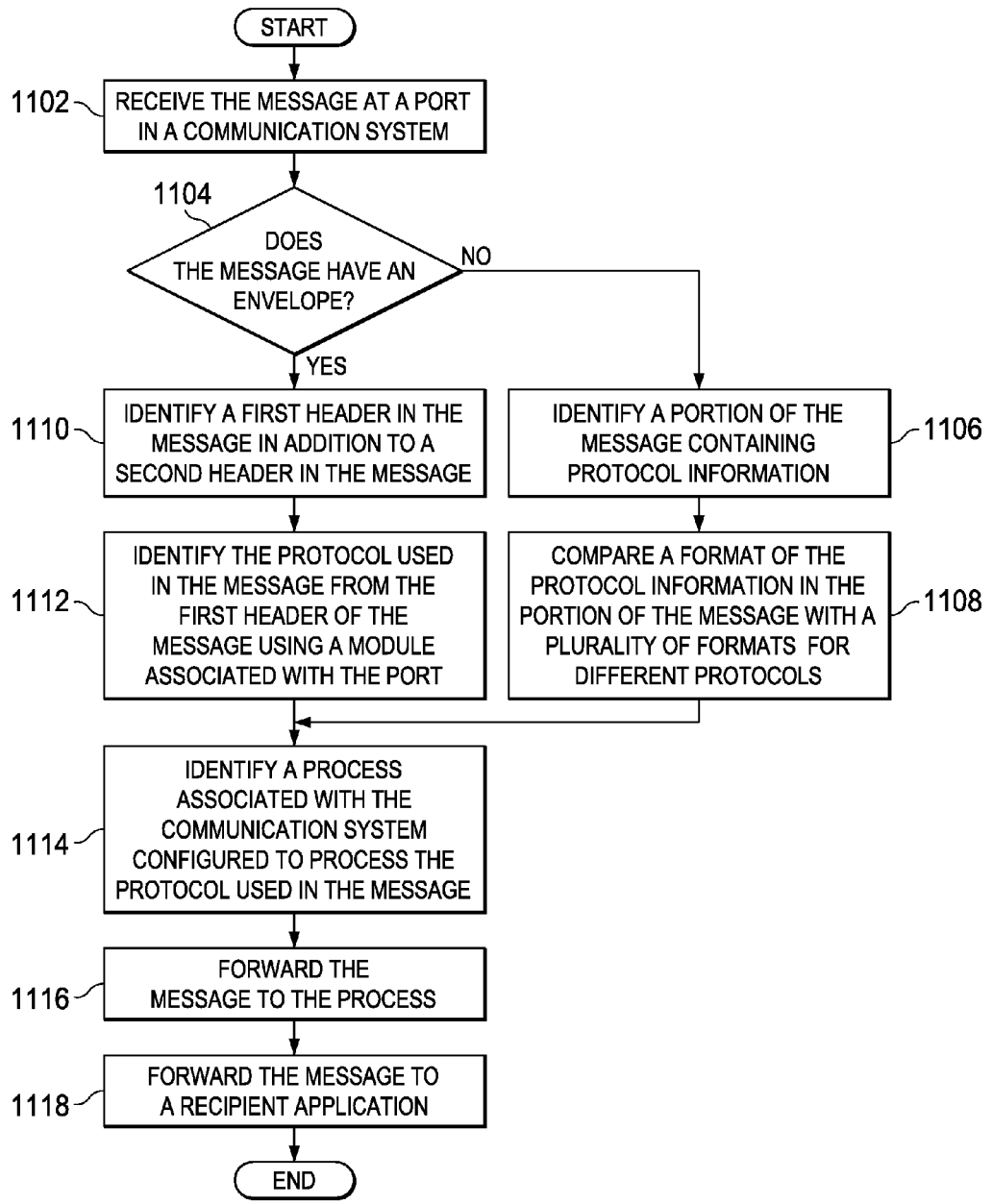
FIG. 11 is a flowchart of a process for processing a message received at a universal port in accordance with an illustrative embodiment.

With reference now to FIG. 11, a flowchart of a process for processing a message received at a universal port is depicted in accordance with an illustrative embodiment. The process illustrated in FIG. 11 may be implemented in communication system 304 by computer system 302 in FIG. 3. The process also may be implemented by module 506 for communication system 508 in FIG. 5.

The process begins by receiving the message at a port in a communication system (step 1102). The process then determines whether the message has an envelope (step 1104). In step 1104, the message may have an additional header added to the message. The additional header may have been added by an application that sent the message. The additional header is an example of the envelope.

If the process determines that the message does not have an envelope, the process identifies a portion of the message containing protocol information (step 1106). In step 1106, the portion is identified when the message is received at the socket. Thereafter, the process compares a format of the protocol information in the portion of the message with a plurality of formats for different protocols (step 1108). In step 1108, the process identifies the protocol used in the message. For example, the protocol is identified using network and transport layer protocols prior to the message being forwarded to applications using application layer protocols.

If the process determines that the message has an envelope, the process identifies a first header in the message in addition to a second header in the message (step 1110). In step 1110, the first header is an example of the envelope. The first header is located before a second header in the message. The first header uses a first protocol. The second header uses a protocol used in the message.

The process then identifies the protocol used in the message from the first header of the message using a module associated with the port (step 1112). Thereafter, the process identifies a process associated with the communication system configured to process the protocol used in the message (step 1114). In step 1114, the process may be a software processor that processes messages using the protocol used in the message. The process then forwards the message to the process (step 1116). In step 1116, the process identifies a recipient application that is an intended destination for the message. The process may also modify the message so that the recipient application may understand the information in the message. Thereafter the process forwards the message to the recipient application (step 1118), with the process terminating thereafter.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 12, an illustration of a block diagram of a data processing system is depicted in accordance with an illustrative embodiment. In this illustrative example, data processing system 1200 includes communications fabric 1202, which provides communications between processor unit 1204, memory 1206, persistent storage 1208, communications unit 1210, input/output (I/O) unit 1212, and display 1214. In these illustrative examples, data processing system 1200 may be used to implement one or more computers in computer system 302 in FIG. 3.

Processor unit 1204 serves to process instructions for software that may be loaded into memory 1206. Processor unit 1204 may be a number of processors, a multi-processor core, or some other type of processor, depending on the particular implementation. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for processing by processor unit 1204. The processes of the different embodiments may be performed by processor unit 1204 using computer implemented instructions, which may be located in a memory, such as memory 1206.

These instructions are referred to as program code, computer usable program code, or computer readable program code that may be read and processed by a processor in processor unit 1204. The program code in the different embodiments may be embodied on different physical or tangible computer readable media, such as memory 1206 or persistent storage 1208.

Program code 1218 is located in a functional form on computer readable media 1220 that is selectively removable and may be loaded onto or transferred to data processing system 1200 for processing by processor unit 1204. Program code 1218 and computer readable media 1220 form computer program product 1222 in these examples. In one example, computer readable media 1220 may be computer readable storage media 1224 or computer readable signal media 1226. Computer readable storage media 1224 may include, for example, an optical or magnetic disk that is inserted or placed into a drive or other device that is part of persistent storage 1208 for transfer onto a storage device, such as a hard drive, that is part of persistent storage 1208. Computer readable storage media 1224 also may take the form of a persistent storage, such as a hard drive, a thumb drive, or a flash memory, that is connected to data processing system 1200. In some instances, computer readable storage media 1224 may not be removable from data processing system 1200. In these illustrative examples, computer readable storage media 1224 is a non-transitory computer readable storage medium.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

Storage devices 1216 are examples of implementations of storage device 430 in FIG. 4. Further, program code 1218 may include program code for identifying the protocol used in a message or processing messages using the protocol. For example program code 1218 is an example of module 506 in FIG. 5. Program code 1218 may also be an example of port 406 in FIG. 4.

The different components illustrated for data processing system 1200 are not meant to provide architectural limitations to the manner in which different embodiments may be implemented. The different illustrative embodiments may be implemented in a data processing system including components in addition to, or in place of, those illustrated for data processing system 1200. Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

As another example, a storage device in data processing system 1200 is any hardware apparatus that may store data. Memory 1206, persistent storage 1208, and computer readable media 1220 are examples of storage devices in a tangible form.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1206, or a cache, such as found in an interface and memory controller hub that may be present in communications fabric 1202.

As another example, a storage device in data processing system 1200 is any hardware apparatus that may store data. Memory 1206, persistent storage 1208, and computer readable media 1220 are examples of storage devices in a tangible form.

The different illustrative embodiments recognize and take into account that it may be desirable to be able to use a port in a communication system for messages using different protocols. The different illustrative embodiments also recognize and take into account that it may be desirable reduce a size of the program code that needs to be maintained at the port of a communication system. The different illustrative embodiments provide techniques to identify the protocol of the message. Once the protocol of the message is identified then the message can be sent to a process configured to process the specific protocol used in the message.

By identifying the protocol at the port, the different illustrative embodiments reduce an amount of program code that needs to be maintained. Further, because the port can identify the protocol used in any message in the network, the program code at the port is consistently reused.

Thus, the different illustrative embodiments provide a method and computer program product for identifying a protocol used in a message. The message is received at a socket associated with a port in a communication system. A portion of the message containing protocol information is identified in response to the message being received at the socket. The protocol used in the message is identified from the protocol information in the portion of the message. The message is forwarded to a process configured to process the protocol.

The different illustrative embodiments further provide a method for identifying a protocol used in a message. The message is received at a port in a communication system. A first header is identified in the message in addition to a second header in the message in response to the message being received. The first header has a format using a first protocol. The second header has a format using the protocol used in the message. The protocol used in the message is identified from the first header of the message using a module associated with the port. The module is configured to identify information using the first protocol.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for identifying a protocol used in a message, the method comprising:
   receiving the message at a universal port in a communication system, wherein the universal port is capable of receiving the message using any number of different protocols;
   determining whether the message has an envelope, wherein an additional header added by an application that sent the message forms the envelope;
   responsive to a determination that the message does not have an envelope, identifying a portion of the message containing protocol information, wherein the portion is identified when the message is received at a socket associated with the universal port;
   comparing a format of the protocol used in the message from the protocol information in the portion of the message with a plurality of formats for different protocols, wherein a matching of the protocol information in the portion of the message with one of the plurality of formats for different protocols identifies the protocol used in the message;
   responsive to a determination that the message has an envelope, identifying a first header in the message in addition to a second header in the message, wherein the first header forming the envelope, and the first header is located before a second header in the message, the first header uses a first protocol and the second header uses a protocol used in the message;
   identifying the protocol used in the message from the first header of the message using a module associated with the port;
   identifying a process associated with the communication system configured to process the protocol used in the message; and
   forwarding the message to the process identified.

2. The method of claim 1 further comprising:
   identifying by the process a recipient application that is an intended destination for the message, wherein the process performs one of maintaining the message as received or modifying the message so that the recipient application may understand the information in the message; and
   responsive to identifying the protocol used in the message, forwarding the message to the recipient application using a protocol of an application layer.

3. The method of claim 1, wherein comparing a format of the protocol used in the message from the protocol information in the portion of the message with a plurality of formats for different protocols comprises:
   comparing a format of the protocol information in the portion of the message with a set of formats comprising formats of protocol information for a plurality of different protocols stored in a storage device.

4. The method of claim 1 further comprising:
   storing a set of formats of protocol information for each of the plurality of protocols in a storage device to form a plurality of formats for different protocols; and
   wherein a matching of the protocol information in the portion of the message with one of the plurality of formats for different protocols identifies the protocol used in the message comprises:
   comparing a format of the protocol information in the portion of the message with the plurality of formats for different protocols in the storage device, wherein the protocols used are representative of a transport layer and a network layer.

5. The method of claim 1, wherein the communication system is an enterprise service bus comprising a plurality of processes and wherein the plurality of processes includes one or more processes configured to process messages using one of a plurality of different protocols.

6. The method of claim 1, wherein the socket is a network socket associated with a transmission control protocol/internet protocol stack.

7. The method of claim 1, wherein the communication system is an enterprise service bus comprising a plurality of processes, wherein the plurality of processes includes one or more processes configured to process messages using one of a plurality of different protocols, wherein the process is one of the plurality of processes, and further comprising:
   storing a set of formats of protocol information for each of a plurality of protocols in a storage device to form a plurality of formats for different protocols; and
   wherein a matching of the protocol information in the portion of the message with one of the plurality of formats for different protocols identifies the protocol used in the message comprises:
   comparing a format of the protocol information in the portion of the message with the plurality of formats for different protocols in the storage device, wherein the protocols used are representative of a transport layer and a network layer.

8. A method for identifying a protocol used in a message, the method comprising:
   receiving the message at a universal port in a communication system, wherein the universal port is capable of receiving the message using any number of different protocols;
   determining whether the message has an envelope;
   responsive to a determination the message does not have an envelope, identifying a protocol of the message by comparing a format of the protocol used in the message from protocol information in a portion of the message with a plurality of formats for different, wherein a matching of the protocol information in the portion of the message with one of the plurality of formats for different protocols identifies the protocol used in the message;
   responsive to a determination the message has an envelope, identifying by a module associated with the universal port a first header in the message in addition to a second header in the message, wherein the first header forms the envelope, and has a format using a first protocol and wherein the second header has a format using the protocol used in the message; and
   identifying the protocol used in the message from the first header of the message using the module wherein the module is configured to identify information using the first protocol.

9. The method of claim 8 further comprising:
   identifying a process associated with the communication system configured to process the protocol used in the message; and
   forwarding the message to the process identified.

10. The method of claim 9, wherein the communication system is an enterprise service bus comprising a plurality of processes and wherein the plurality of processes include one or more processes configured to process messages using one of a plurality of different protocols.

11. The method of claim 8, wherein the first protocol is added to the message by an application sending messages to the communication system.

12. The method of claim 8, wherein the first protocol is a communication protocol that is different than the protocol used in the message and wherein the first header is placed before the second header in the message.

13. The method of claim 8, wherein the module parses only the first header to identify the protocol used in the message.

14. The method of claim 8, wherein the communication system is an enterprise service bus comprising a plurality of processes, wherein the plurality of processes includes one or more processes configured to process messages using one of a plurality of different protocols, and further comprising:
  identifying a process in the plurality of processes associated with the enterprise service bus that is configured to process the protocol used in the message; and
  forwarding the message to the process identified.

15. A computer program product for identifying a protocol used in a message, the computer program product comprising:
  a set of computer readable storage devices;
  program code, stored on at least one of the set of computer readable storage devices, configured to receive the message at a universal port in a communication system, wherein the universal port is capable of receiving the message using any number of different protocols;
  program code, stored on at least one of the set of computer readable storage devices, configured to determine whether the message has an envelope, wherein an additional header added by an application that sent the message forms the envelope;
  program code, stored on at least one of the set of computer readable storage devices, configured responsive to a determination that the message does not have an envelope, to identify a portion of the message containing protocol information, wherein the portion is identified when the message is received at a socket associated with the universal port;
  program code, stored on at least one of the set of computer readable storage devices, configured to compare a format of the protocol used in the message from the protocol information in the portion of the message with a plurality of formats for different protocols, wherein a matching of the protocol information in the portion of the message with one of the plurality of formats for different protocols identifies the protocol used in the message;
  program code, stored on at least one of the set of computer readable storage devices, configured responsive to a determination that the message has an envelope, to identify a first header in the message in addition to a second header in the message, wherein the first header forms the envelope, and the first header is located before a second header in the message, the first header uses a first protocol and the second header uses a protocol used in the message;
  program code, stored on at least one of the set of computer readable storage devices, configured to identify the protocol used in the message from the first header of the message using a module associated with the port; and
  program code, stored on at least one of the set of computer readable storage devices, configured to forward the message to the process identified.

16. The computer program product of claim 15 further comprising:
  program code, stored on at least one of the set of computer readable storage devices, configured to identify by the process a recipient application that is an intended destination for the message, wherein the process performs one of maintaining the message as received or modifying the message so that the recipient application may understand the information in the message; and
  program code, stored on at least one of the set of computer readable storage devices, configured to forward the message to the recipient application using a protocol of an application layer in response to identifying the protocol used in the message.

17. The computer program product of claim 15, wherein the computer program code configured to compare a format of the protocol used in the message from the protocol information in the portion of the message with a plurality of formats for different protocols comprises:
  program code, stored on at least one of the set of computer readable storage devices, configured to compare a format of the protocol information in the portion of the message with a set of formats comprising formats of protocol information for a plurality for different protocols stored in a storage device.

18. The computer program product of claim 15 further comprising:
  program code, stored on at least one of the set of computer readable storage devices, configured to store a set of formats of protocol information for each of the plurality of protocols in a storage device to form a plurality of formats for different protocols; and
  wherein the program code configured to match the protocol information in the portion of the message with one of the plurality of formats for different protocols identifies the protocol used in the message comprises:
  program code, stored on at least one of the set of computer readable storage devices, configured to compare a format of the protocol information in the portion of the message with the plurality of formats for different protocols in the storage device, wherein the protocols used are representative of a transport layer and a network layer.

19. The computer program product of claim 15, wherein the communication system is an enterprise service bus comprising a plurality of processes and wherein the plurality of processes includes one or more processes configured to process messages using one of a plurality of different protocols.

20. The computer program product of claim 15, wherein the socket is a network socket associated with a transmission control protocol/internet protocol stack.

* * * * *